US012736303B2

(12) United States Patent
Racionero Zabalo et al.

(10) Patent No.: US 12,736,303 B2
(45) Date of Patent: Sep. 15, 2026

(54) STOCK FOR A FIREARM AND METHOD OF MANUFACTURING A STOCK FOR A FIREARM

(71) Applicant: DIKAR, S.COOP., Arrasate-Mondragon (ES)

(72) Inventors: Ion Racionero Zabalo, Arrasate-Mondragon (ES); Santiago Jorge Neira Hernández, Barakaldo (ES)

(73) Assignee: DIKAR, S.COOP., Arrasate-Mondragon (ES)

( * ) Notice: Subject to any disclaimer, the term of this patent is extended or adjusted under 35 U.S.C. 154(b) by 0 days.

(21) Appl. No.: 19/180,666

(22) Filed: Apr. 16, 2025

(65) Prior Publication Data

US 2026/0160521 A1 Jun. 11, 2026

(30) Foreign Application Priority Data

Oct. 3, 2024 (EP) .................................... 24383072

(51) Int. Cl.

| | |
|---|---|
| ***F41C 23/18*** | (2006.01) |
| ***B29C 43/02*** | (2006.01) |
| ***B29C 70/22*** | (2006.01) |
| ***B29C 70/44*** | (2006.01) |
| ***F41C 23/16*** | (2006.01) |
| *B29K 105/12* | (2006.01) |

(Continued)

(52) U.S. Cl.

CPC .............. *F41C 23/18* (2013.01); *B29C 43/02* (2013.01); *B29C 70/22* (2013.01); *B29C 70/443* (2013.01); *F41C 23/16* (2013.01); *B29K 2105/12* (2013.01); *B29K 2307/04* (2013.01); *B29L 2031/777* (2013.01)

(58) Field of Classification Search

CPC .......... F41C 23/04; F41C 23/06; F41C 23/02; F41C 23/20; F41C 23/14; F41C 23/22

USPC ................................................ 42/71.01–75.1

See application file for complete search history.

(56) References Cited

U.S. PATENT DOCUMENTS

| | | | | |
|---|---|---|---|---|
| 2,753,642 | A * | 7/1956 | Sullivan | F41C 23/18 264/269 |
| 4,934,084 | A * | 6/1990 | Thomas | F41C 23/18 42/71.01 |
| 9,297,599 | B2 * | 3/2016 | Underwood | F41A 3/66 |

(Continued)

FOREIGN PATENT DOCUMENTS

WO 2021240024 A1 12/2021

OTHER PUBLICATIONS

European Search Report, U.S. Appl. No. 24/383,072, filed Feb. 19, 2025, 6 pages.

*Primary Examiner* — Michael D David

(74) *Attorney, Agent, or Firm* — Edell, Shapiro & Finnan, LLC

(57) ABSTRACT

A stock for a firearm. The stock includes a foam core, a carbon fiber skin and a carbon fiber insert having a housing for housing the action mechanisms of the firearm. The carbon fiber insert includes a sheet molding compound (SMC) or a bulk molding compound (BMC) that includes a resin matrix and randomly arranged chopped carbon fibers in the resin matrix. The foam core has a cavity in which the carbon fiber insert is housed. The carbon fiber skin covers the foam core and at least part of the carbon fiber insert housed in its cavity, the carbon fiber insert being mechanically bonded to the carbon fiber skin.

9 Claims, 7 Drawing Sheets

(51) Int. Cl.

| | |
|---|---|
| *B29K 307/04* | (2006.01) |
| *B29L 31/00* | (2006.01) |

(56) References Cited

U.S. PATENT DOCUMENTS

| | | | | |
|---|---|---|---|---|
| 10,539,387 | B1 * | 1/2020 | Joplin | F41A 21/487 |
| 2007/0033850 | A1 * | 2/2007 | Murello | F41C 23/16 42/71.01 |
| 2010/0162608 | A1 * | 7/2010 | McCann | F41C 23/14 42/71.01 |
| 2011/0107642 | A1 * | 5/2011 | Godard | F41C 23/16 156/60 |
| 2012/0144715 | A1 * | 6/2012 | Simpson | F41C 23/18 42/74 |
| 2012/0266514 | A1 * | 10/2012 | Michal | F41C 23/22 42/90 |
| 2014/0109452 | A1 * | 4/2014 | Baker | F41C 23/06 42/1.06 |
| 2014/0325889 | A1 * | 11/2014 | Michal | F41C 27/00 42/75.01 |
| 2017/0241738 | A1 * | 8/2017 | Simpson | F41C 23/06 |
| 2020/0378723 | A1 * | 12/2020 | Trimble | F41G 3/165 |
| 2022/0364818 | A1 * | 11/2022 | Maguire | F41A 99/00 |
| 2023/0046241 | A1 * | 2/2023 | Allan | F41C 23/18 |
| 2025/0321077 | A1 * | 10/2025 | Dovenberg | F41C 23/04 |
| 2026/0160521 | A1 * | 6/2026 | Racionero Zabalo | F41A 3/66 |

* cited by examiner

STOCK FOR A FIREARM AND METHOD OF MANUFACTURING A STOCK FOR A FIREARM

CROSS-REFERENCE TO RELATED APPLICATIONS

This application claims the benefit and priority to European Application No. EP24383072.6, filed Oct. 3, 2024, of which is incorporated by reference herein in its entirety.

TECHNICAL FIELD

The present invention relates to stocks for a firearm and methods of manufacturing such stocks.

BACKGROUND

A firearm basically comprises three main parts: action mechanisms, a barrel and a stock. The action mechanisms load and fire the projectiles, which then pass through the barrel before being ejected. The stock supports the action mechanisms and, in many cases, the barrel. Different materials are often used for the stock.

Stocks for a firearm comprising a foam core and a carbon fiber skin are known to achieve a good compromise between lightness and stiffness compared to traditional aluminum, wood or synthetic plastic stocks. For example, WO2021240024A1 describes a method of manufacturing a stock for a firearm comprising a foam core and a carbon fiber skin.

SUMMARY

The object of the invention is to provide a stock for a firearm and a method of manufacturing a stock for a firearm, as defined in the claims.

A first aspect of the invention relates to a stock for a firearm. The stock of the invention comprises a foam core, a carbon fiber skin and a carbon fiber insert comprising a housing for housing the action mechanisms of the firearm.

In the context of the invention, the fact that the skin and the insert are made of carbon fiber does not imply that they cannot comprise additional materials, and in particular fibers of other types combined with carbon fiber.

The carbon fiber insert comprises a sheet molding compound (SMC) or a bulk molding compound (BMC) comprising a resin matrix and randomly arranged chopped carbon fibers in the resin matrix. The foam core comprises a cavity in which the carbon fiber insert is housed. The carbon fiber skin covers the foam core and at least part of the carbon fiber insert housed in its cavity, and the carbon fiber insert is mechanically bonded to the carbon fiber skin. In fact, both mechanical and chemical bonding is obtained between the carbon fiber skin and the carbon fiber insert.

In the stock of the invention, the carbon fiber skin and the carbon fiber insert bonded to the carbon fiber skin form a carbon fiber coating over the foam core. This results in a carbon fiber coated stock that can be manufactured in a repeatable manner using traditional polymeric molding processes, ensuring that in its critical areas, which are in the housing for the action mechanisms, the required mechanical requirements are met, in particular the stiffness requirements, as well as the requirements as to the shape that certain surfaces must have.

A second aspect of the invention relates to a method of manufacturing a stock for a firearm comprising a foam core and a carbon fiber skin. The method of the invention comprises:

- a manufacturing step of a carbon fiber insert by hot stamping a sheet molding compound (SMC) or a bulk molding compound (BMC) comprising a resin matrix and randomly arranged chopped carbon fibers in the resin matrix, the carbon fiber insert comprising a housing to accommodate the firearm action mechanisms,
- a foaming step in which a foamable material is foamed to form the foam core, the foam core comprising a cavity to house the carbon fiber insert,
- a deposition step of carbon fiber skin in which carbon fiber sheets are deposited on the foam core and on at least part of the carbon fiber insert housed in its cavity, and
- a final shaping step of the carbon fiber skin in which external pressure and temperature is applied to the carbon fiber sheets deposited on the foam core, the carbon fiber insert being mechanically bonded to the carbon fiber skin.

In this way, a method of manufacturing a carbon fiber coated stock for a firearm by means of traditional molding processes of polymeric materials is achieved which is repeatable, and which makes it possible to ensure that, in the critical areas of the stock, which are located in the housing to accommodate the actuating mechanisms, the requirements mentioned in relation to the first aspect of the invention are met.

These and other advantages and features of the invention will become apparent in view of the figures and the detailed description of the invention.

DETAILED DESCRIPTION

Figure 1:
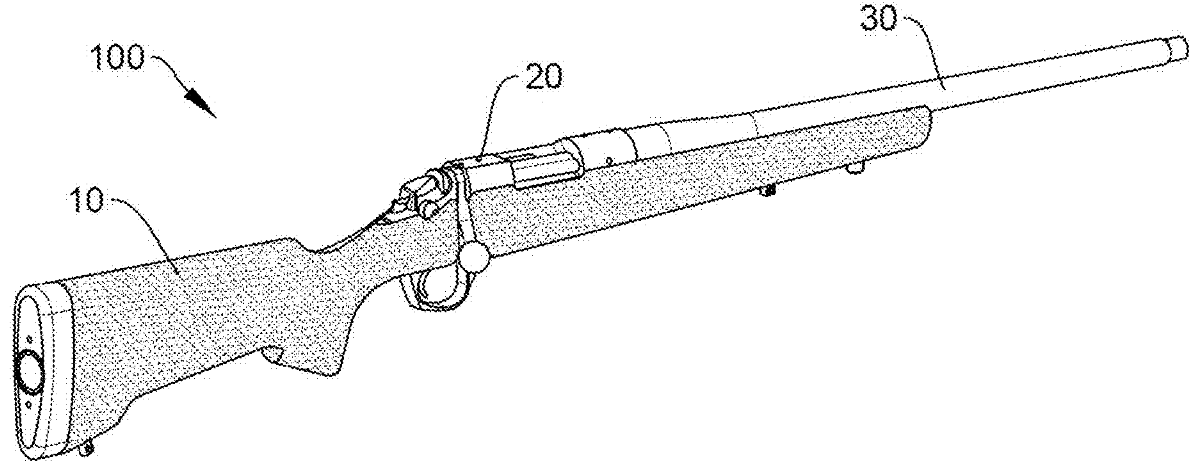
FIG. 1 shows a schematic representation of a firearm.

The invention relates to a stock 10 for a firearm 100. The firearm 100 comprises action mechanisms 20, a barrel 30 and a stock 10, as shown in FIG. 1.

Figure 2:
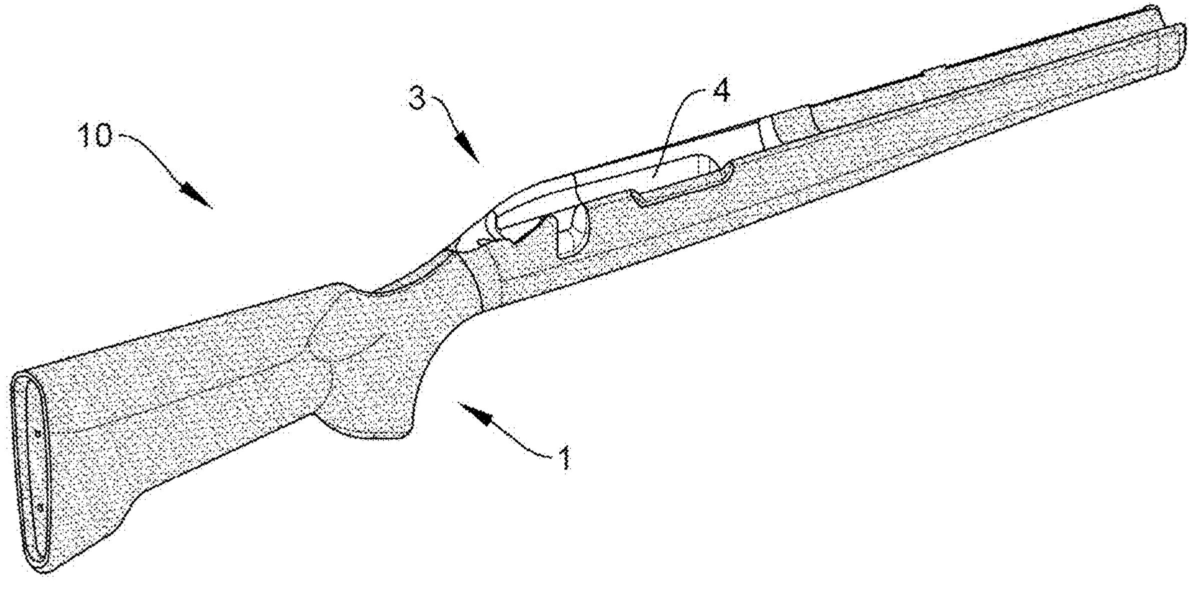
FIG. 2 shows a perspective view of a stock according to one embodiment.

The stock 10 of the invention comprises a carbon fiber skin 1, a carbon fiber insert 3, as shown in FIG. 2, and a foam core 2 (not shown in FIG. 2).

The carbon fiber insert 3 comprises a housing 4 for housing the action mechanisms of the firearm 20, as shown in FIGS. 2 to 6. The carbon fiber insert 3 comprises a sheet molding compound (SMC) or a bulk molding compound (BMC) comprising a resin matrix and randomly arranged chopped carbon fibers in the resin matrix.

Figure 4:
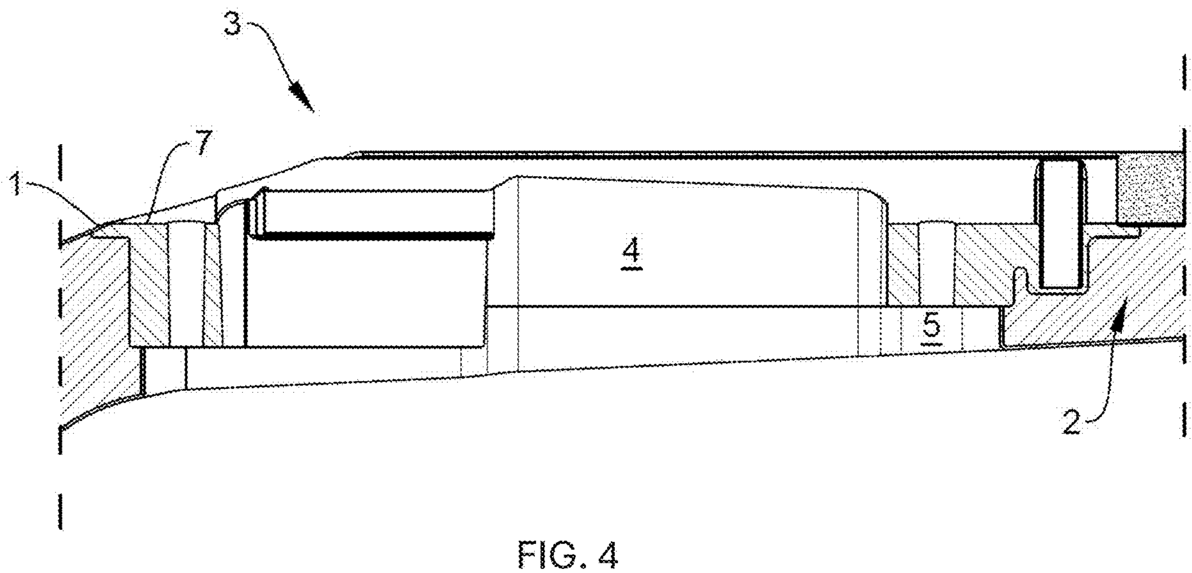
FIG. 4 shows a partial section view of FIG. 2.
Figure 5:
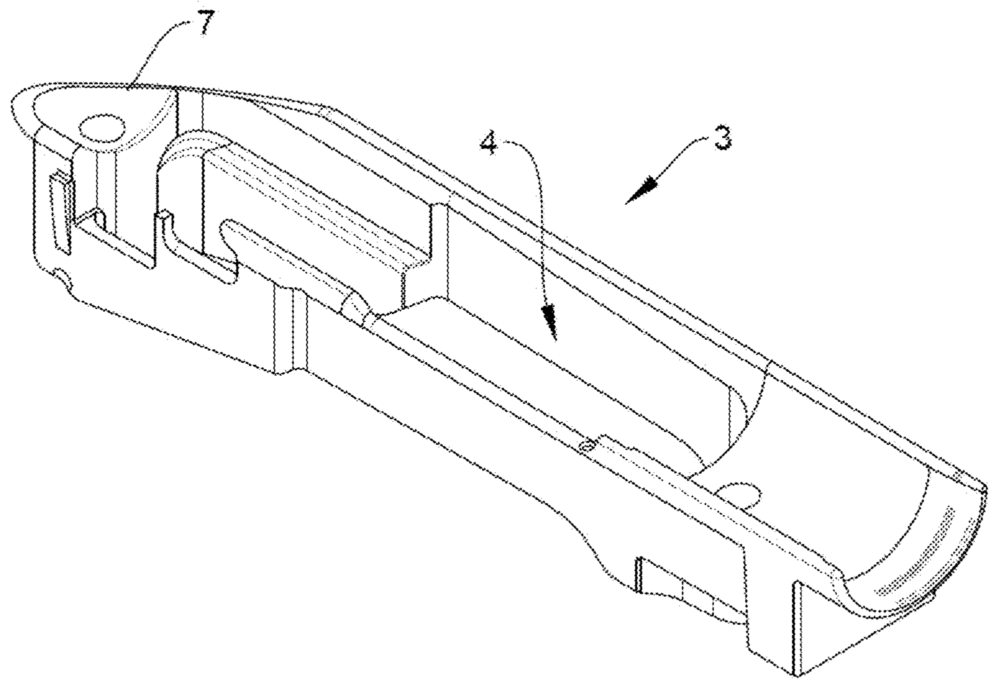
FIG. 5 shows a detailed view of the carbon fiber insert of FIG. 2.
Figure 6:
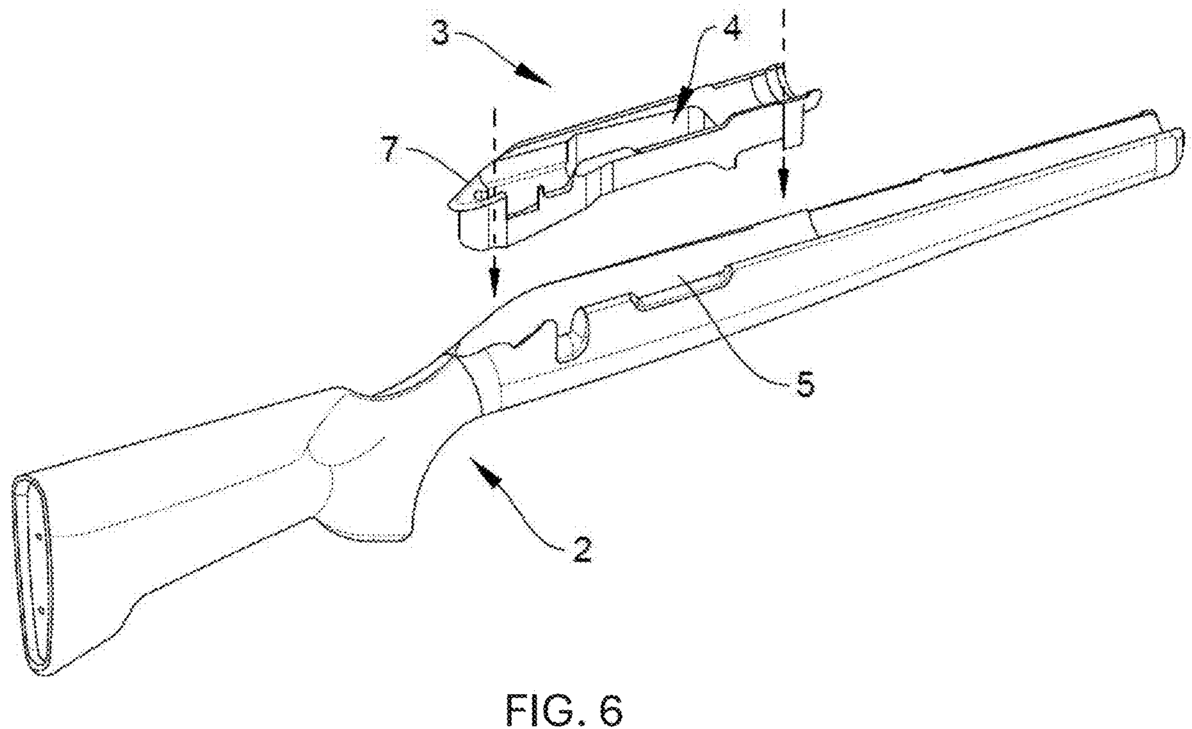
FIG. 6 shows an exploded view of the foam core and carbon fiber insert of the stock of FIG. 2.

The foam core 2 comprises a cavity 5 for housing the carbon fiber insert 3, as shown in FIGS. 4 and 6.

Figure 3:
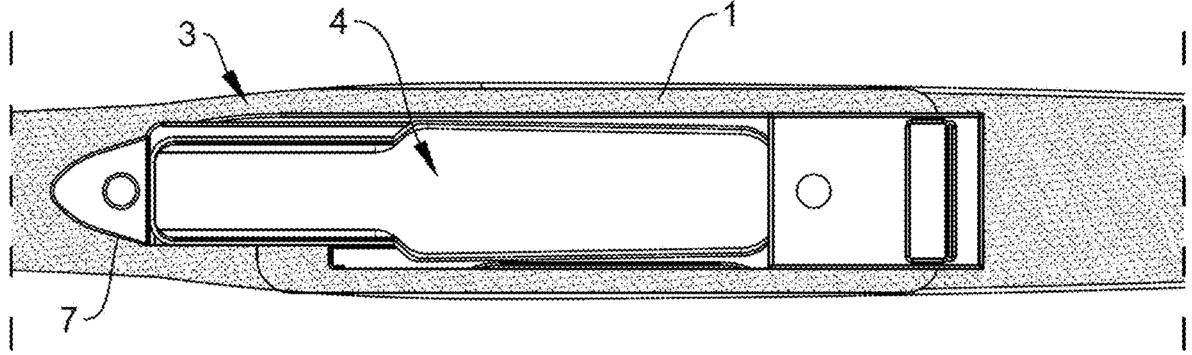
FIG. 3 shows a partial plan view of FIG. 2.

The carbon fiber skin 1 covers the foam core 2 and at least part of the carbon fiber insert 3 housed in its cavity 5, as shown in FIGS. 2 to 4. The carbon fiber insert 3 is mechanically and chemically bonded to the carbon fiber skin 1.

In the stock 10 of the invention, the carbon fiber skin 1 and the carbon fiber insert 3 bonded to the carbon fiber skin 1 form a carbon fiber coating on the foam core 2. This results in a carbon fiber coated stock 10 which can be manufactured in a repeatable manner by traditional polymeric molding processes, ensuring that in its critical areas, which are located in the housing 4 for housing the action mechanisms, the required mechanical requirements are met, in particular the stiffness requirements, as well as the requirements as to the shape that certain surfaces must have.

In a preferred embodiment, the carbon fiber insert 3 comprises a perimeter zone 7 delimiting the outer contour of the housing 4, at least part of the perimeter zone 7 being covered by the carbon fiber skin 1, as shown in FIGS. 3 and 4.

In a preferred embodiment, the carbon fiber insert 3 comprises aramid fibers, i.e. polyparaphenylene terephthalamide fibers, more commonly known as Kevlar®, blended with the carbon fibers in the resin matrix. In this way, high-speed impact resistance is improved. The weight ratio of aramid fibers to carbon fibers is preferably at most 1:3.

In a preferred embodiment, the percentage by weight of fibers of the carbon fiber insert 3 is between 30-50%, preferably between 35-45%.

In a preferred embodiment, the carbon fiber skin 1 comprises a plurality of sheet molding compounds (SMC) comprising a resin matrix and chopped carbon fibers randomly arranged in the resin matrix.

Preferably the carbon fiber insert 3 and the carbon fiber skin 1 have the same composition.

In a preferred embodiment, the carbon fiber skin 1 comprises a plurality of meshes comprising dry, woven carbon fibers formed by resin transfer molding (RTM).

Figure 7:
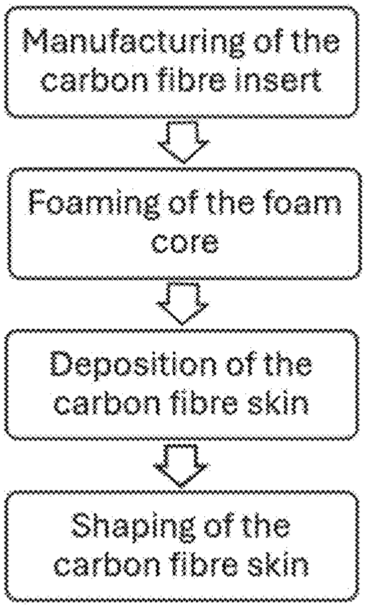
FIG. 7 shows a flow diagram of the method of manufacturing a stock for a firearm according to an embodiment of the invention.

The invention also relates to a method of manufacturing a stock 10 for a firearm 100 comprising a foam core 2 and a carbon fiber skin 1. The method of the invention, as shown schematically in FIG. 7, comprises:

- a manufacturing step of a carbon fiber insert 3 by hot stamping a sheet molding compound (SMC) or a bulk molding compound (BMC) comprising a resin matrix and randomly arranged chopped carbon fibers in the resin matrix, the carbon fiber insert 3 comprising a housing 4 to accommodate the firearm action mechanisms,
- a foaming step in which a foamable material is foamed to form the foam core 2, the foam core 2 comprising a cavity 5 for housing the carbon fiber insert 3,
- a deposition step of the carbon fiber skin 1 in which carbon fiber sheets 6 are deposited on the foam core 2 and on at least part of the carbon fiber insert 3 housed in its cavity 5, and
- a final shaping step of the carbon fiber skin 1 in which external pressure and temperature is applied to the carbon fiber sheets 6 deposited on the foam core 2, the carbon fiber insert 3 being mechanically bonded to the carbon fiber skin 1.

This provides a method of manufacturing a carbon fiber coated stock 10 for firearm using traditional polymeric molding processes that is repeatable and ensures that the critical areas of the stock, which are located in the housing 4 for the action mechanisms, meet the required mechanical and form requirements.

In a preferred embodiment, the carbon fiber insert 3 comprises a perimeter zone 7 delimiting the outer contour of the housing 4, at least part of the perimeter zone 7 being covered by the carbon fiber sheets 6 which are deposited at the deposition step.

In a preferred embodiment, at the foaming step the carbon fiber insert 3 is arranged in a mold in which the foamable material is foamed to form the foam core 2 with the insert housed in its cavity 5.

In a preferred embodiment, the carbon fiber sheets 6 deposited at deposition step of the carbon fiber skin 1 are a plurality of sheet molding compounds (SMC) comprising a resin matrix and randomly arranged chopped carbon fibers in the resin matrix. Preferably, the molding compound of the manufacturing step of the carbon fiber insert 3 and the molding compounds of the deposition step of the carbon fiber skin 1 have the same composition.

In a preferred embodiment, at the final shaping step of the carbon fiber skin 1 the carbon fiber sheets 6 are shaped by hot stamping.

In a preferred embodiment, the carbon fiber sheets 6 deposited at the deposition step of the carbon fiber skin 1 are a plurality of meshes comprising dry and woven carbon fibers, and at the final shaping step of the carbon fiber skin 1 the carbon fiber sheets 6 are shaped by resin transmission molding (RTM).

In a preferred embodiment, the method comprises between the carbon fiber skin 1 deposition step and the final shaping step of the carbon fiber skin 1, a fixing step of the carbon fiber sheets 6 by applying an adhesive under the deposited carbon fiber sheets 6 and/or applying vacuum pressure on the deposited carbon fiber sheets 6.

Embodiments are disclosed in the clauses that follow.

Clause 1. Stock for a firearm, the stock (10) comprising a foam core (2) and a carbon fiber skin (1), the stock further comprising a carbon fiber insert (3) comprising a housing (4) for housing the action mechanisms of the firearm, the carbon fiber insert (3) comprising a sheet molding compound or a bulk molding compound comprising a resin matrix and randomly arranged chopped carbon fibers in the resin matrix, the foam core (2) comprising a cavity (5) in which the carbon fiber insert (3) is housed, the carbon fiber skin (1) covering the foam core (2) and at least part of the carbon fiber insert (3) housed in its cavity (5), and the carbon fiber insert (3) being mechanically bonded to the carbon fiber skin (1).

Clause 2. Stock according to clause 1, wherein the carbon fiber insert (3) comprises a perimeter zone (7) that delimits the outer contour of the housing (4), at least part of the perimeter zone (7) being covered by the carbon fiber skin (1).

Clause 3. Stock according to clause 1 or 2, wherein the carbon fiber insert (3) comprises aramid fibers blended with the carbon fibers in the resin matrix, wherein the weight ratio of aramid fibers to carbon fibers is preferably at most 1:3.

Clause 4. Stock according to any of clauses 1 to 3, wherein the percentage by weight of fibers of the carbon fiber insert (3) is between 30-50%, preferably between 35-45%.

Clause 5. Stock according to any of the preceding clauses, wherein the carbon fiber skin (1) comprises a plurality of sheet molding compounds comprising a resin matrix and randomly arranged chopped carbon fibers in the resin matrix.

Clause 6. Stock according to any of the preceding clauses, wherein the carbon fiber insert (3) and the carbon fiber skin (1) have the same composition.

Clause 7. Stock according to any of the clauses 1 to 4, wherein the carbon fiber skin (1) comprises a plurality of meshes comprising dry, woven carbon fibers shaped by resin transmission molding.

Clause 8. Method of manufacturing a stock for a firearm, the stock (10) comprising a foam core (2) and a carbon fiber skin (1), the method comprises

- a manufacturing step of a carbon fiber insert (3) by hot stamping a sheet molding compound or a bulk molding compound comprising a resin matrix and randomly arranged chopped carbon fibers in the resin matrix, the carbon fiber insert (3) comprising a housing (4) for housing the firearm action mechanisms,
- a foaming step in which a foamable material is foamed to form the foam core (2), the foam core (2) comprising a cavity (5) for housing the carbon fiber insert (3),
- a deposition step of the carbon fiber skin (1) in which carbon fiber sheets (6) are deposited on the foam core (2) and on at least part of the carbon fiber insert (3) housed in its cavity (5); and
- a final shaping step of the carbon fiber skin (1) in which external pressure and temperature is applied to the carbon fiber sheets (6) deposited on the foam core (2), the carbon fiber insert (3) being mechanically bonded to the carbon fiber skin (1).

Clause 9. Method of manufacturing a stock according to clause 8, wherein the carbon fiber insert (3) comprises a perimeter area (7) delimiting the outer contour of the housing (4), at least part of the perimeter area (7) being covered by the carbon fiber sheets (6) that are deposited in the deposition step.

Clause 10. Method of manufacturing a stock according to clause 8 or 9, wherein at the foaming step the carbon fiber insert (3) is arranged in a mold in which the foamable material is foamed to form the foam core (2) with the insert housed in its cavity (5).

Clause 11. Method of manufacturing a stock according to any of clauses 8 to 10, wherein the carbon fiber sheets (6) deposited at the deposition step of the carbon fiber skin (1) are a plurality of molding compounds comprising a resin matrix and randomly arranged chopped carbon fibers in the resin matrix.

Clause 12. Method of manufacturing a stock according to the preceding clause, wherein the molding compound of the manufacturing step of the carbon fiber insert (3) and the molding compounds of the deposition step of the carbon fiber skin (1) have the same composition.

Clause 13. Method of manufacturing a stock according to any of clauses 8 to 12, wherein at the final shaping step of the carbon fiber skin (1) the carbon fiber sheets (6) are shaped by means of hot stamping.

Clause 14. Method of manufacturing a stock according to any of clauses 8 to 10, wherein the carbon fiber sheets (6) deposited at deposition step of the carbon fiber skin (1) are a plurality of meshes comprising dry and woven carbon fibers, and at the final shaping step of the carbon fiber skin (1) the carbon fiber sheets (6) are shaped by resin transmission molding.

Clause 15. Method of manufacturing according to any of clauses 8 to 14, comprising between the deposition step of the carbon fiber skin (1) and the final shaping step of the carbon fiber skin (1), a fixing step of the carbon fiber sheets (6) by applying an adhesive under the deposited carbon fiber sheets (6) and/or applying vacuum pressure on the deposited carbon fiber sheets (6).

The invention claimed is:

1. A stock for a firearm having action mechanisms for loading and firing projectiles, the stock comprising:

- a carbon fiber insert including a housing for housing at least a portion of the action mechanisms, the carbon fiber insert comprising a sheet molding compound or a bulk molding compound comprising a resin matrix and randomly arranged chopped carbon fibers in the resin matrix;
- a foam core that includes a cavity in which at least a portion of the carbon fiber insert is housed; and
- a carbon fiber skin at least partially covering the foam core and at least partially covering the carbon fiber insert, at least a portion of the carbon fiber insert being mechanically bonded to the carbon fiber skin.

2. The stock according to claim 1, wherein the carbon fiber insert includes a perimeter zone that delimits an outer contour of the housing, at least part of the perimeter zone being covered by the carbon fiber skin.

3. A stock according to claim 1, wherein the carbon fiber insert comprises aramid fibers blended with the carbon fibers in the resin matrix.

4. The stock according to claim 3, wherein the weight ratio of aramid fibers to carbon fibers is at most 1:3.

5. The stock according to claim 1, wherein the percentage by weight of the carbon fibers in the carbon fiber insert is 30-50%.

6. The stock according to claim 1, wherein the percentage by weight of the carbon fibers in the carbon fiber insert is 35-45%.

7. The stock according to claim 1, wherein the carbon fiber skin comprises a plurality of sheet molding compounds comprising a resin matrix and randomly arranged chopped carbon fibers in the resin matrix.

8. The stock according to claim 1, wherein the carbon fiber insert and the carbon fiber skin have the same composition.

9. The stock according to claim 1, wherein the carbon fiber skin comprises a plurality of meshes comprising dry, woven carbon fibers shaped by resin transmission molding.

* * * * *